United States Patent

Onan et al.

[11] Patent Number: 5,327,968
[45] Date of Patent: Jul. 12, 1994

[54] UTILIZING DRILLING FLUID IN WELL CEMENTING OPERATIONS

[75] Inventors: David D. Onan, Lawton; Dralen T. Terry, Duncan; Patty L. Totten, Duncan; Bobby G. Brake, Duncan; Bobby J. King, Duncan, all of Okla.

[73] Assignee: Halliburton Company, Duncan, Okla.

[21] Appl. No.: 998,279

[22] Filed: Dec. 30, 1992

[51] Int. Cl.$^5$ .............................. F21B 33/14
[52] U.S. Cl. ................... 166/293; 106/796; 106/800; 106/812; 166/292
[58] Field of Search ............. 166/292, 293; 106/D96, 106/800, 801, 812

[56] References Cited

U.S. PATENT DOCUMENTS

| | | | |
|---|---|---|---|
| Re. 32,742 | 9/1988 | Skjeldal | 106/631 X |
| 2,646,360 | 7/1953 | Lea . | |
| 2,705,050 | 3/1955 | Davis et al. | 166/293 |
| 2,875,835 | 3/1959 | Watkins et al. | 166/293 |
| 3,168,139 | 2/1965 | Kennedy et al. | 166/292 |
| 3,180,748 | 4/1965 | Holmgren et al. | 166/293 X |
| 3,499,491 | 3/1970 | Wyant et al. | 166/292 |
| 3,887,009 | 6/1975 | Miller et al. | 166/292 |
| 4,328,036 | 5/1982 | Nelson et al. | 166/293 X |
| 4,384,896 | 5/1983 | Aitcin et al. . | |
| 4,385,935 | 5/1983 | Skjeldal | 106/607 |
| 4,410,366 | 10/1983 | Birchall et al. . | |
| 4,775,505 | 10/1988 | Kuroda et al. | 264/82 |
| 4,781,760 | 11/1988 | Svensson et al. | 210/751 |
| 4,818,288 | 4/1989 | Aignesberger et al. | 252/8.554 |
| 4,933,013 | 6/1990 | Sakai et al. . | |
| 4,935,060 | 6/1990 | Dingsoyr | 106/720 X |
| 5,016,711 | 5/1991 | Cowan | 166/250 |
| 5,020,598 | 6/1991 | Cowan et al. | 166/293 |
| 5,086,850 | 2/1992 | Harris et al. | 175/61 |

Primary Examiner—George A. Suchfield
Attorney, Agent, or Firm—Robert A. Kent; C. Clark Dougherty, Jr.; Thomas R. Weaver

[57] ABSTRACT

The present invention provides methods of cementing a well with a cementing composition utilizing a portion of the drilling fluid used to drill the well as a component in the cementing composition. The methods basically comprise forming a set-activated cementing composition comprised of water, silica fume, a dispersing agent, a set-activator, a set delaying additive and a portion of the drilling fluid, introducing the resulting set-activated cementing composition into the well and permitting the cementing composition to set into a hard mass therein.

20 Claims, No Drawings

UTILIZING DRILLING FLUID IN WELL CEMENTING OPERATIONS

BACKGROUND OF THE INVENTION

1. Field of the Invention

The present invention relates generally to utilizing drilling fluid in well cementing operations, and more particularly, to methods of cementing a well with a cementing composition which includes a portion of the drilling fluid used to drill the well.

2. Description of the Prior Art

A variety of drilling fluids are used in drilling well bores. Generally, the drilling fluids are solids containing water based gels or hydrocarbon based fluids which can be non-weighted or weighted with particulate weighting material such as barite. After a well bore is drilled during which the drilling fluid used is circulated through the well bore, the circulation of the drilling fluid is stopped while the well is logged and a string of pipe is run in the well bore. After the pipe is run, the drilling fluid in the well bore is cleaned up by circulating drilling fluid downwardly through the interior of the pipe and upwardly through the annulus between the exterior of the pipe and the walls of the well bore while removing drilling solids and gas therefrom. Primary cementing operations are then performed in the well bore, i.e., the string of pipe disposed in the well bore is cemented therein by placing a cementing composition in the annulus between the pipe and the walls of the well bore. The cementing composition sets into a hard substantially impermeable mass whereby the pipe is bonded to the walls of the well bore and the annulus is sealed. When the cementing composition is run down the pipe and into the annulus, the drilling fluid in the pipe and annulus is displaced therefrom. The used drilling fluid is generally accumulated in a pit or tank and then disposed of.

The disposal of drilling fluid is time consuming and expensive, particularly in offshore drilling locations, in that drilling fluid often must be disposed of as a fluid which is hazardous to the environment. Thus, any environmentally safe use to which all or part of the drilling fluid could be put at a well site thereby eliminating the need for disposing of the drilling fluid would be highly advantageous.

By the present invention, methods of cementing wells with cementing compositions containing drilling fluid are provided. That is, a portion of the drilling fluid used to drill a well is utilized as a component in the cementing composition used for cementing the well. The portion of the drilling fluid which is not utilized in the cementing composition can be disposed of conventionally, or it can ultimately be formed into a hard environmentally safe cementitious mass in an underground or other location.

SUMMARY OF THE INVENTION

The present invention provides methods of cementing a well with a cementing composition utilizing a portion of the drilling fluid used to drill the well as a component in the cementing composition. The methods basically comprise the first step of forming a set-activated cementing composition comprised of water, particulate condensed silica fume consisting of particles having diameters less than about 1 micrometer suspended in the water in a weight ratio of condensed silica fume to water in the range of from about 1:2 to about 1.5:1, a dispersing agent for facilitating the dispersal of the silica fume particles in the water and maintaining the particles in suspension therein, a set-activator selected from calcium hydroxide, magnesium oxide or mixtures thereof, a set delaying additive for increasing the time in which the cementing composition sets after the set-activator is combined therewith and a portion of the drilling fluid used to drill the well in an amount whereby the weight ratio of the drilling fluid to the other components of the cementing composition is in the range of from about 1:10 to about 1:3. Upon being formed, the cementing composition is introduced into the well to be cemented, and the composition is permitted to set into a cementitious mass therein.

In forming the set-activated cementing composition described above, the water, particulate condensed silica fume, dispersing agent, and set delaying additive components of the composition can be mixed with all or a portion of the drilling fluid in the well bore as the drilling fluid is circulated to form the drilling fluid into a non-activated cementing slurry. The set-activator can then be combined with a portion of the non-activated drilling fluid and that portion placed in the zone in the well to be cemented, e.g., the annulus. As the set-activated portion of the cementing composition containing drilling fluid is placed in the zone to be cemented, the unused portion of drilling fluid is displaced from the well bore. If the unused portion has been combined with the above mentioned components whereby it comprises a non-activated cementing slurry, it can be transported to a location of use or disposal, combined with the set-activator and allowed to set into an environmentally safe cementitious mass. If the unused portion of the drilling fluid has not been combined with the above described components, it can be combined therewith and with the set activator at the location of use or disposal or it can be disposed of in any other safe manner.

It is, therefore, a general object of the present invention to provide methods of utilizing drilling fluid in well cementing operations.

Other and further objects, features and advantages of the present invention will be readily apparent to those skilled in the art upon a reading of the description of preferred embodiments which follows.

DESCRIPTION OF PREFERRED EMBODIMENTS

Well bores are most commonly drilled using a rotary bit connected to a string of drill pipe. The drill pipe and bit are rotated and a drilling fluid, generally a water base gel or a hydrocarbon base fluid with or without weighting material suspended therein is circulated downwardly through the drill pipe, through ports in the drill bit and then upwardly through the annulus between the drill pipe and the walls of the well bore to the surface. An example of a water base gel is an aqueous solution of a clay such as bentonite containing particulate weighting material such as barite.

The drilling fluid carries cuttings produced by the drill bit to the surface which are separated from the drilling fluid as is any gas therein. A reservoir of circulating drilling fluid is maintained on the surface, and the drilling fluid is pumped from the reservoir by circulating pumps back into the drill string. When the well bore has reached its desired depth, the drilling and the circulation of drilling fluid are stopped, the drill pipe and bit are removed from the well bore, subterranean formations penetrated by the well bore are usually logged and pipe to be cemented in the well bore is run therein.

After the pipe to be cemented has been run in the well bore, a primary cementing operation is carried out whereby the drilling fluid in the well bore is displaced out of the well bore by a cement slurry and one or more liquid spacers which are pumped downwardly through the pipe and then upwardly into the annulus between the pipe and the walls of the well bore. The cement slurry hardens into a substantially impermeable solid mass in the annulus which bonds the pipe to the walls of the well bore and seals the annulus whereby formation fluids are prevented from flowing into the annulus between subterranean zones penetrated by the well bore and/or to the surface.

As mentioned above, the used drilling fluid which is displaced from the well bore during primary cementing must often be disposed of as a hazardous fluid under environmental protection laws. Such disposal of the drilling fluid is time consuming and expensive, particularly at offshore drilling locations where the used drilling fluid must be displaced into a tanker, transported to shore, unloaded and disposed of on shore in an environmentally safe manner.

The present invention provides methods of cementing a well using a cementing composition which contains a portion of the drilling fluid used to drill the well. The methods basically comprise the steps of forming a set-activated cementing composition containing drilling fluid, introducing the cementing composition into the well to be cemented and permitting the cementing composition to set into a hard cementitious mass having compressive strength therein.

The set-activated cementing compositions of this invention are comprised of water, particulate condensed silica fume consisting of particles having diameters less than about 1 micrometer suspended in the water in a weight ratio of condensed silica fume to water in the range of from about 1:2 to about 1.5:1, a dispersing agent for facilitating the dispersal of the silica fume particles in the water and maintaining the particles in suspension therein, a set-activator selected from calcium hydroxide, magnesium oxide or mixtures thereof, a set delaying additive for increasing the time in which the cementing composition sets after the set-activator is combined therewith and drilling fluid present in an amount whereby the weight ratio of the drilling fluid to the other components of the cementing composition is in the range of from about 1:10 to about 1:3. The set-activated cementing compositions have excellent flow and solids suspension properties, thixotropy, little or no soluble free lime, anti-strength retrogression, corrosion resistance and low fluid loss properties.

Condensed silica fume, also known as amorphous silica, silica dust or volitized silica is commercially available as an ultra fine powder consisting of submicron size spheres having an average diameter of about 0.1 micrometer. Condensed silica fume is a by-product material produced in the manufacture of silicon and ferrosilicon. Silicon and ferrosilicon are obtained by subjecting quartz (when silicon is produced) or quartz and an iron bearing material (when ferrosilicon is produced) to reduction with coke or coal and wood chips in an open electric arc furnace. The reduction reaction involves an intermediate reaction wherein a gaseous suboxide of silicon is formed and part of the gaseous suboxide of silicon escapes into the atmosphere. The gaseous suboxide of silicon reacts with oxygen in the atmosphere and condenses to form glassy microscopic particles known as condensed silica fume.

The condensed silica fume is recovered by filtration and is characterized by having a very fine particle size. The average size of condensed silica fume particles is about 0.1 micrometer which is about 100 times smaller than that of API Portland cement and about 10 times smaller than very fine cements such as those described in U.S. Pat. No. 4,761,183 to Clark and U.S. Pat. No. 4,160,674 to Sawyer. The specific surface area of condensed silica fume particles is about 20,000 square meters per kilogram, and the condensed silica fume generally contains more than about 90% amorphous silicon dioxide. The specific chemical composition of condensed silica fume varies in accordance with the particular silicon product produced.

The condensed silica fume can be obtained commercially in a dry powder form or in a relatively concentrated aqueous slurry form. When obtained in a slurry form, the slurry generally has a weight ratio of condensed silica fume to water in the range of from about 2:3 to about 3:2.

In whatever form the condensed silica fume is obtained, it is combined with water or additional water to form a slurry having a weight ratio of condensed silica fume to water in the range of from about 1:2 to about 1.5:1, and a dispersing agent is combined with the water to facilitate the dispersal of the silica fume particles in the water and maintain the particles in suspension therein. While various dispersing agents can be used, a particularly suitable dispersing agent is comprised of the condensed polymer product of an aliphatic ketone, an aliphatic aldehyde and a compound which introduces acid groups into the condensation polymer. Such a dispersing agent is disclosed in U.S. Pat. No. 4,818,288 issued Apr. 4, 1989 to Aignesberger et al., which is incorporated herein by reference.

The most preferred dispersing agent of the type described above for use in accordance with this invention is comprised of the condensation polymer product of acetone, formaldehyde and sodium sulfite. The dispersing agent is generally included in the cementitious composition in an amount in the range of from about 1% to about 5% by weight of solids, or an equivalent amount of about 2% to about 7% by weight of water in the composition. Generally, the above described dispersing agent is commercially available in an aqueous solution containing the dispersing agent in an amount in the range of from about 30% to about 35% by weight of the solution.

The set delaying additive for increasing the time in which the cementitious composition of this invention sets after the set-activator is combined therewith can be any of various set delaying additives heretofore utilized in cement compositions, e.g., a copolymer of AMPS ® (2-acrylamido-2-methyl propane sulfonic acid) and acrylic acid, tartaric acid or calcium or ammonium lignosulfonate salts. Preferably, the set delaying additive is a lignosulfonate salt, most preferably calcium lignosulfonate, present in the cementing composition in an amount in the range of from about 0.1% to about 2% by weight of the composition. Such a lignosulfonate salt can be obtained commercially in an aqueous solution containing the lignosulfonate salt in an amount in the range of from about 40% to about 60% by weight of the solution.

The set-activator, preferably calcium hydroxide, is generally present in the cementing composition of this invention in an amount whereby the weight ratio of condensed silica fume to calcium hydroxide is in the range of from about 1:1.5 to about 3:1.

The drilling fluid component of the cementing composition of this invention can be comprised of any aqueous or hydrocarbon base drilling fluid so long as the drilling fluid doesn't contain compounds which adversely react with the other components of the cementing composition. Most commonly used water base gels and hydrocarbon base drilling fluids do not adversely react with the other components of the cementing composition. The drilling fluid is included in the cementing composition in an amount whereby the weight ratio of the drilling fluid to the other components of the cementing composition is in the range of from about 1:10 to about 1:3.

In forming the set-activated cementing composition of this invention and utilizing it for carrying out well cementing operations, a non-activated cementing slurry is preferably first prepared by mixing the water, condensed silica fume, dispersing agent, set delaying additive and drilling fluid. Then, just prior to introducing the cementing composition into a subterranean zone to be cemented by way of a well bore penetrating the zone, the set-activator component is combined with the non-activated cementing slurry to form the set-activated cementing composition.

If desired, the non-activated cementing slurry without the drilling fluid can be preformed by mixing the various components at a location remote from the well site, or the components can be mixed at the well site just prior to use. The drilling fluid can then be combined with the cementing slurry followed by combining the set-activator therewith to form the set-activated cementing composition including drilling fluid.

In cementing operations carried out at offshore well locations, the non-activated cementing slurry less the drilling fluid is preferably preformed on land and then mixed with the drilling fluid and calcium hydroxide activator at the job site. When the location of the well site is on land, it is generally most convenient and economical to mix the components of the non-activated cementing slurry including drilling fluid at the well site and mix the non-activated cementing slurry with the set-activator just prior to introducing the resulting set-activated cementing composition into the well bore. When the non-activated cementing slurry is formed at the well site, it can be preformed and stored until use or the various components can be mixed with the drilling fluid on-the-fly. The set-activator can also be mixed with the non-activated cementing slurry on-the-fly as the resulting set-activated cementing composition is pumped into a subterranean zone to be cemented by way of the well bore penetrating the zone. The term "on-the-fly" is used herein to mean that the components of the cementing composition are mixed as they are being pumped and the resulting set-activated cementing composition is pumped into a well bore and subterranean zone to be cemented.

A preferred set-activated cementing composition for use in accordance with this invention is comprised of water, particulate condensed silica fume consisting of particles having diameters less than about 1 micrometer and having an average particle diameter of about 0.1 micrometer suspended in the water in a weight ratio of condensed silica fume to water in the range of from about 1:2 to about 1.5:1, a dispersing agent comprised of the condensation polymer product of acetone, formaldehyde and sodium sulfite present in an amount sufficient to maintain the condensed silica fume particles in suspension, a set-activator comprised of calcium hydroxide present in the composition in an amount whereby the weight ratio of condensed silica fume to calcium hydroxide is in the range of from about 1:1.5 to about 3:1, a set-delaying additive comprised of calcium lignosulfonate present in the composition in an amount sufficient to delay the set of the composition until after it is placed in a zone to be cemented and drilling fluid used to drill the well bore present in the composition in an amount whereby the weight ratio of the drilling fluid to the other components of the composition is in the range of from about 1:10 to about 1:3.

In the most preferred cementing composition for use in accordance with this invention, the weight ratio of condensed silica fume to water in the composition is about 1:1, the weight ratio of condensed silica fume to calcium hydroxide activator in the composition is about 2:1, the above described dispersing agent is present in the composition in an amount of about 2.5% by weight of water in the composition, the above described set delaying additive is present in the composition in an amount of about 0.3% by weight of the composition and drilling fluid is present in the composition whereby the weight ratio of drilling fluid to the other components of the composition is about 1:5. As indicated above, the methods of the present invention are particularly suitable for performing primary cementing in a well bore. However, the methods can be utilized for performing other cementing procedures in the well bore such as cementing zones of lost circulation in a well bore.

In performing the methods of this invention, the set-activated cementing composition can be formed by mixing the water, particulate condensed silica fume, dispersing agent and set delaying additive components of the composition with either all or a portion of the drilling fluid as the drilling fluid is circulated in the well bore to form a non-activated cementing slurry containing drilling fluid. The set-activator can then be combined with the non-activated cementing slurry or a portion thereof and that portion pumped into the zone in the well to be cemented, e.g., the annulus. As the set-activated portion of the cementing composition containing drilling fluid is placed in the zone to be cemented, the unused portion of drilling fluid is displaced from the well bore. If the unused portion has been combined with the above-mentioned components whereby it comprises a non-activated cementing slurry, it can be transported to a location of use or disposal, combined with the set-activator, placed in a safe area and permitted to set into a cementitious mass. If the unused portion of the drilling fluid has not been combined with the above described components, it can be combined therewith and with the set activator at the location of use or disposal or it can be disposed of in any other safe manner.

In the most preferred method of forming a pumpable set-activated cementing composition containing drilling fluid for use in accordance with this invention, a concentrated aqueous slurry of the particulate condensed silica fume is mixed with additional water and with aqueous solutions of the dispersing agent and the set delaying additive to thereby form a pumpable non-activated cementing slurry less the drilling fluid. As mentioned above, the cementing slurry less drilling fluid can be preformed at a location remote from the job site, it can be preformed and stored at the job site or it can be formed on-the-fly at the job site. The drilling fluid used is combined with the non-activated cementing slurry and the resulting cementing slurry containing drilling fluid is combined with the set-activator, both of which can be on-the-fly. The resulting set-activated cementing composition is placed in the subterranean zone to be cemented and permitted to set therein.

The concentrated aqueous slurry of particulate condensed silica fume preferably has a weight ratio of condensed silica fume to water of about 1:1. The aqueous solution of the above described preferred dispersing agent preferably contains the dispersing agent in an amount of about 33% by weight of solution, and the aqueous solution of the above described preferred set delaying additive preferably contains the set delaying additive in an amount of about 40% by weight of the solution. The aqueous solution of calcium hydroxide activator preferably contains the activator in an amount of about 30% by weight of the solution.

In order to further illustrate the methods of this invention, the following examples are given.

EXAMPLE 1

A cementitious composition of this invention was prepared containing the following components and amounts.

| Component | Amount, parts by weight |
|---|---|
| Silica Fume | 300 |
| Water | 400 |
| Liquid Dispersing Agent[1] | 40 |
| Liquid Set Delaying Additive[2] | 13 |
| Calcium Hydroxide Activator | 300 |
| Drilling Fluid[3] | 263.25 |
| Total | 1316.25 |

[1] A 33% by weight aqueous solution of the condensation polymer product of acetone, formaldehyde and sodium sulfite.
[2] A 40% by weight aqueous solution of calcium lignosulfonate.
[3] 8.8 pounds/gallon fresh water mud (30 parts by weight bentonite and 350 parts fresh water).

A test sample of the above composition was tested for 72 hour compressive strength at 80° F. in accordance with the *API Specification for Materials and Testing for Well Cements*, API Specification 10A, 21st Edition dated Sep. 1, 1991, of the American Petroleum Institute, Washington, D.C. The result of the test was that the composition had a compressive strength of 1240 psi.

EXAMPLE 2

Another cementitious composition of this invention was prepared containing the following components and amounts.

| Component | Amount, parts by weight |
|---|---|
| Silica Fume | 300 |
| Water | 675 |
| Liquid Dispersing Agent[1] | 30.38 |
| Magnesium Oxide Activator | 10.13 |
| Calcium Hydroxide Activator | 150 |
| Drilling Fluid[2] | 874.13 |
| Total | 2039.64 |

[1] A 33% by weight aqueous solution of the condensation polymer product of acetone, formaldehyde and sodium sulfite.
[2] 8.8 pounds/gallon fresh water drilling mud (100 parts by weight bentonite, 116.7 parts fresh water, 13.3 parts liquid dispersant and 3.3 parts sodium hydroxide).

A test sample of the above composition was tested for 24 hour compressive strength at 80° F. The result of the test was 100 psi.

From the above examples it can be seen that the cementitious compositions of this invention have good compressive strengths and are suitable for use in well cementing operations.

The present invention is, therefore, well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a well with a cementing composition utilizing a portion of the drilling fluid used to drill the well as a component in the cementing composition comprising the steps of:
    forming a set-activated cementing composition comprising water, particulate condensed silica fume consisting of particles having diameters less than about 1 micrometer suspended in said water in a weight ratio of condensed silica fume to water in the range of from about 1:2 to about 1.5:1, a dispersing agent for facilitating the dispersal of said silica fume particles in said water and maintaining said particles in suspension therein, a set-activator selected from the group consisting of calcium hydroxide, magnesium oxide and mixtures thereof, a set delaying additive for increasing the time in which said composition sets after said set-activator is combined therewith and a portion of said drilling fluid in an amount whereby the weight ratio of said drilling fluid to the other components of said cementing composition is in the range of from about 1:10 to about 1:3;
    introducing the resulting cementing composition into said well; and
    permitting said cementing composition to set into a hard mass in said well.

2. The method of claim 1 wherein said dispersing agent is comprised of the condensation polymer product of acetone, formaldehyde and sodium sulfite, and is present in said cementing composition in an amount in the range of from about 2% to about 7% by weight of water in said composition.

3. The method of claim 2 wherein said set delaying agent is comprised of a lignosulfonate salt present in said cementing composition in an amount in the range of from about 0.1% to about 2% by weight of said composition.

4. The method of claim 3 wherein said set-activator is calcium hydroxide present in said cementing composition in an amount whereby the weight ratio of condensed silica fume to calcium hydroxide is in the range of from about 1:1.5 to about 3:1.

5. The method of claim 1 wherein the step of forming said set-activated cementing composition comprises:

mixing said water, said particulate silica fume, said dispersing agent, said set delaying additive and said drilling fluid to form a non-activated cementing slurry;

combining said set-activator with said non-activated cementing slurry; and immediately thereafter introducing the resulting activated cementing composition into said well.

6. A method of cementing a subterranean zone penetrated by a well bore comprising the steps of:

forming a pumpable set-activated cementing composition comprised of water, particulate condensed silica fume consisting of particles having diameters less than about 1 micrometer and having an average particle diameter of about 0.1 micrometer suspended in said water in a weight ratio of condensed silica fume to water in the range of from about 1:2 to about 1.5:1, a dispersing agent comprised of the condensation polymer product of acetone, formaldehyde and sodium sulfite, a set-activator comprised of calcium hydroxide present in said cementing composition in an amount whereby the weight ratio of condensed silica fume to calcium hydroxide is in the range of from about 1:1.5 to about 3:1, a set delaying additive comprised of calcium lignosulfonate and drilling fluid used to drill said well bore in an amount whereby the weight ratio of said drilling fluid to the other components of said cementing composition is in the range of from about 1:10 to about 1:3;

pumping said cementing composition into said zone by way of said well bore; and allowing said cementing composition to set in said zone.

7. The method of claim 6 wherein the step of forming said pumpable set activated cementing composition comprises:

mixing a concentrated aqueous slurry of said particulate condensed silica fume with additional water, with preformed aqueous solutions of said dispersing agent and said set delaying additive and with said drilling fluid to thereby form a pumpable non-activated cementing slurry;

combining an aqueous solution of said calcium hydroxide activator with said non-activated cementitious slurry to activate said cementitious slurry; and immediately thereafter pumping the resulting set-activated cementing composition into said zone.

8. The method of claim 7 wherein said preformed concentrated aqueous slurry of particulate condensed silica fume has a weight ratio of silica fume solids to water in the range of from about 2:3 to about 3:2.

9. The method of claim 8 wherein said aqueous solution of said dispersing agent contains said dispersing agent in an amount in the range of from about 30% to about 35% by weight of solution.

10. The method of claim 9 wherein said aqueous solution of set delaying additive contains calcium lignosulfonate in an amount in the range of from about 40% to about 60% by weight of solution.

11. The method of claim 10 wherein said aqueous solution of said calcium hydroxide activator contains said activator in an amount in the range of from about 25% to about 40% by weight of solution.

12. The method of claim 11 wherein said components of said non-activated cementing slurry except for said drilling fluid are premixed at a location remote from said well bore and said drilling fluid and set activator solution are combined therewith at said location.

13. A method of cementing a string of pipe in a well bore containing drilling fluid comprising:

placing said string of pipe in said well bore;

circulating said drilling fluid by pumping it downwardly through the interior of said pipe and upwardly through the annulus between the exterior of said pipe and the walls of said well bore while conditioning said drilling fluid by removing drilling solids and gas therefrom;

combining a portion of said conditioned drilling fluid with a set activated cementing slurry in an amount whereby the weight ratio of said drilling fluid to the other components of said set-activated cementing slurry is in the range of from about 1:10 to about 1:3 to form a set-activated cementing composition containing drilling fluid, said set-activated cementing slurry comprising water, particulate condensed silica fume consisting of particles having diameters less than about 1 micrometer suspended in said water in a weight ratio of condensed silica fume to water in the range of from about 1:2 to about 1.5:1, a dispersing agent for facilitating the dispersal of said silica fume particles in said water and maintaining said particles in suspension therein, a set-activator selected from the group consisting of calcium hydroxide, magnesium oxide and mixtures thereof, and a set delaying additive for increasing the time in which said composition sets after said set-activator is combined therewith;

pumping said set-activated cementing composition containing drilling fluid into said annulus by way of the interior of said pipe while displacing drilling fluid from said annulus therewith; and allowing said cementing composition containing drilling fluid to set into a hard mass in said annulus.

14. The method of claim 13 wherein said dispersing agent is comprised of the condensation polymer product of acetone, formaldehyde and sodium sulfite, and is present in said cementing composition in an amount in the range of from about 2% to about 7% by weight of water in said composition.

15. The method of claim 14 wherein said set delaying agent is comprised of a lignosulfonate salt present in said cementing composition in an amount in the range of from about 0.1% to about 2% by weight of said composition.

16. The method of claim 15 wherein said set-activator is calcium hydroxide present in said cementing composition in an amount whereby the weight ratio of condensed silica fume to calcium hydroxide is in the range of from about 1:1.5 to about 3:1.

17. A method of cementing a string of pipe in a wellbore containing drilling fluid comprising:

placing said string of pipe in said wellbore;

circulating said drilling fluid by pumping it downwardly through the interior of said pipe and upwardly through the annulus between the exterior of said pipe and the walls of said wellbore while conditioning said drilling fluid by removing drilling solids and gas therefrom;

combining a portion of said conditioned drilling fluid with a concentrated aqueous slurry of a particulate condensed silica fume having a weight ratio of silica fume solids to water in the range of from about 1:2 to about 1.5:1, additional water, and preformed aqueous solutions of a dispersing agent and a set delaying additive to thereby form a pumpable non-activated cementing slurry;

combining an aqueous solution of a set-activator with said non-activated cementing slurry to thereby form a set activated cementing composition;

immediately thereafter pumping said set-activated cementing composition into a zone of said wellbore; and allowing said set-activated cementing composition containing drilling fluid to set into a hard mass in said zone;

wherein the weight ratio of said drilling fluid to the other components of said set-activated cementing composition is in the range of from about 1:10 to about 1:3;

said particulate condensed silica fume consists of particles having diameters less than about 1 micrometer suspended in said water; and said set-activator is selected from the group consisting of calcium hydroxide, magnesium oxide and mixtures thereof.

18. The method of claim 17 wherein said aqueous solution of said dispersing agent contains said dispersing agent in an amount in the range of from about 30% to about 35% by weight of solution and wherein said dispersing agent is comprised of the condensation polymer product of acetone, formaldehyde and sodium sulfite, and is present in said set-activated cementing composition in an amount in the range of from about 2% to about 7% by weight of water in said set-activated cementing composition.

19. The method of claim 18 wherein said aqueous solution of said set delaying additive contains calcium lignosulfonate in an amount in the range of from about 40% to about 60% by weight of solution and said lignosulfonate is present in said set-activated cementing composition in an amount in the range of from about 0.1% to about 2% by weight of said set-activated cementing composition.

20. The method of claim 19 wherein said aqueous solution of said set-activator contains said activator in an amount in the range of from about 25% to about 40% by weight of solution and wherein said set-activator is calcium hydroxide present in said set-activated cementing composition in an amount whereby the weight ration of condensed silica fume to calcium hydroxide is in the range of from about 1:5.5 to about 3:1.

* * * * *